United States Patent [19]
Gude et al.

[11] 4,316,977

[45] Feb. 23, 1982

[54] COPOLYMER OF MALEIC ANHYDRIDE, DICYCLOPENTADIENE AND VINYLCYCLOHEXENE AND ITS USE AS ANIONIC PAPER SURFACE SIZING MATERIAL

[75] Inventors: Fritz Gude, Herne; Herbert Haferkorn, Bottrop; Felix Schülde, Wulfen, all of Fed. Rep. of Germany

[73] Assignee: Chemische Werke Huls Aktiengesellschaft, Kreis Recklinghausen, Fed. Rep. of Germany

[21] Appl. No.: 192,853

[22] Filed: Oct. 1, 1980

[51] Int. Cl.³ ............................. C08F 222/06

[52] U.S. Cl. .................. 526/272; 162/169; 525/327

[58] Field of Search ........................ 526/272

[56] References Cited

U.S. PATENT DOCUMENTS 4,126,739  11/1978  Hoene et al. .................. 526/272

Primary Examiner—Stanford M. Levin
Attorney, Agent, or Firm—Oblon, Fisher, Spivak, McClelland & Maier

[57] ABSTRACT

Terpolymers of maleic anhydride, dicyclopentadiene, and a vinylcyclohexene, preferably 1-vinylcyclohexene-3, are highly effective paper sizing materials.

5 Claims, No Drawings

COPOLYMER OF MALEIC ANHYDRIDE, DICYCLOPENTADIENE AND VINYLCYCLOHEXENE AND ITS USE AS ANIONIC PAPER SURFACE SIZING MATERIAL

BACKGROUND OF THE INVENTION

Description of the Prior Art

The German OS No. 27 27 510 describes an anionic paper surface sizing material which attains its benefits by using copolymers of maleic anhydride and dicyclopentadiene which have been subsequently reacted with ammonia or primary or secondary amines in aqueous solution. The copolymer to be used is obtained in a known manner by polymerization in solution or suspension in the presence of radical catalysts.

It is also known to combine 4-vinyl-cyclohexene with maleic anhydride. In that case azobisisobutyronitrile is used as the catalyst. The applications of this copolymer have not been disclosed.

Russian Pat. No. 370,215 discloses a telomer which is produced by radical copolymerization of maleic anhydride, vinylcyclohexene and carbon tetrachloride. In the example the reaction is conducted for 20 hours at 65°–70° C. and yields ca. 43% of theoretical.

It is generally known to pulp size paper by using rosin soaps and aluminum ions. In addition to known rosin sizing, solutions or dispersions of polymeric compounds have proven effective in paper sizing. The advantage of such synthetic resin sizes is, among others, is that they can be applied to the finished paper surface while the usual resin size is precipitated onto the paper fibers with aluminum ions.

The use of synthetic polymer sizes makes it possible to size paper without adding metal salts. Solutions or dispersions of random copolymers of unsaturated carboxylic acids or their derivatives with certain ethylenically unsaturated compounds are particularly suited for sizes of that type. The level of sizing of papers sized with these copolymers of the prior art does not correspond in all cases, e.g., sizing pulp sized paper, to the technical requirements.

German OS No. 16 21 693 teaches that copolymers containing succinimide groups can be used to size paper surfaces, with vinylogous compounds used as comonomers. Dicyclopentadiene is mentioned as a possible vinylogous compound, among others. To make the described copolymers soluble for paper sizing they must be reacted with ammonia, alkalis or amines. A number of derivatives are produced thereby, due to the content of imide groups.

With the method mentioned above it is necessary, in order to produce the imide groups, either to convert maleic anhydride into maleic imide or afterward to form the imide groupings in a copolymer of maleic anhydride and vinylogs.

For economic reasons, however, it is desirable to simplify as far as possible the production of the copolymer used to size the paper, and for reasons of improved reproducibility to restrict the number of derivatives used in solubilizing them.

SUMMARY OF THE INVENTION

It has now been found surprisingly that copolymers of maleic anhydride, dicyclopentadiene and vinylcyclohexene, which have no imide structure and, thus, avoid an expensive production step, are highly effective paper sizing materials, having an effectiveness which is considerably superior to those described above and having an outstanding sizing effect both on uncoated paper and pulp sized paper. These copolymers and their use for paper sizing have not been previously known.

Therefore the objects of the invention are copolymers of maleic anhydride, dicyclopentadiene and vinylcyclohexene.

DETAILED DESCRIPTION OF THE INVENTION AND PREFERRED EMBODIMENTS 1-vinylcyclohexene-3 is an especially suitable vinylcyclohexene. The molar ratio of maleic anhydride to the diene is 2:1 to 1:1, the molar ratio of dicyclopentadiene to vinylcyclohexene is between 0.95:0.5 and 1:1.

A further object of the invention is the use of the claimed copolymers of maleic anhydride, dicyclopentadiene and vinylcyclohexene as paper surface sizing materials in aqueous alkali solution.

The random copolymers according to the invention are obtained in a known manner by carrying out the polymerization as suspension or solution polymerization in aliphatic or aromatic hydrocarbons such as toluene or xylene, in alcohols, such as ethylene glycol or ethyl glycol or dioxane at temperatures between 60° and 150° C., preferably between 70° and 90° C., in the presence of radical initiators. Azo compounds, peroxides or hydroperoxides can serve as initiators, e.g., azobisisobutyronitrile, benzoyl peroxide or di-tert-butyl peroxide. The initiators are used in amounts of 2 to 6% by weight of the comonomers.

In order to solubilize the copolymers according to the invention, which contain anhydride groups, bases are used to convert them into their salts. However, according to the invention, not all carboxyl groups need to be neutralized, since in general an 80% degree of neutralization, based on the total number of carboxyl groups, is sufficient. Possible cations include especially ammonium and/or mono-, di- or trialkyl ammonium with a total of up to 6 carbon atoms, as well as alkali metal ions. In addition, the copolymers according to the invention can be used in the form of their reaction products with ammonia or primary aliphatic or aromatic amines such as ethylamine, or aniline, or secondary amines such as diethyl amide, morpholine or pyrrolidine and/or aliphatic alcohols. These products also have outstanding paper sizing characteristics.

The amount of the copolymers according to the invention needed for paper sizing lies between 0.05 and 3, preferably between 0.015 and 0.50% by weight, based on the weight of the paper.

The copolymers of the invention used as paper sizing materials can be combined with anionic starches customarily used for paper coating. The usual additives can, if necessary, be added to sizing baths obtained in this manner. Processing can be done by techniques customary in the production of paper.

EXAMPLES

A. Production of the copolymers (1) 1 mole of maleic anhydride is polymerized in 1000 ml of cumene as solvent, and in the presence of 9.2 g of dry benzoyl peroxide as initiator, with a mixture of dicyclopentadiene (DCP) and 1-vinylcyclohexene-3 (VCH). The molar ratio between the maleic anhydride and the diene mixture is 1:1. After the completion of polymerization the material is filtered off and dried of volatile components. The ratio of the utilized dienes, the yields and the identification numbers of the experiments are given in the following Table I:

TABLE I

| Identification Number | DCP:VCH (Molar ratio) | Yield (% of theoretical) |
|---|---|---|
| 1a | 1.00:0.00 | 93 Comparative experiment |
| 1b | 0.95:0.05 | 90 |
| 1c | 0.09:0.10 | 91 |
| 1d | 0.80:0.20 | 91 |
| 1e | 0.70:0.30 | 92 |
| 1f | 0.60:0.40 | 90 |
| 1g | 0.50:0.50 | 93 |

(2) The experiments were performed as described under A1, with the exception, that the molar ratio of maleic anhydride to the diene mixture was 1.2:1. Identification numbers and data are given in Table II:

TABLE II

| Identification Number | DCP:VCH (Molar ratio) | Yield (% of theoretical) |
|---|---|---|
| 2a | 1.00:0.00 | 90 Comparative experiment |
| 2b | 0.80:0.20 | 89 |
| 2c | 0.60:0.40 | 87 |

(3) The experiment was performed as under A1, excepting the molar ratio of maleic anhydride to the diene mixture, which is set at 1:2 in this experiment. Additional information is found in Table III.

TABLE III

| Identification Number | DCP:VCH (Molar ratio) | Yield (% of theoretical) |
|---|---|---|
| 3a | 1.00:0.00 | 92 Comparative experiment |
| 3b | 0.80:0.20 | 94 |
| 3c | 0.60:0.40 | 94 |

(4) In this series the molar ratio of maleic anhydride to the diene mixtures was 1:5. All other experimental conditions were the same as those in A1. Additional information is found in Table IV:

TABLE IV

| Identification Number | DCP:VCH (Molar ratio) | Yield (% of theoretical) |
|---|---|---|
| 4a | 1.00:0.00 | 92 Comparative experiment |
| 4b | 0.80:0.20 | 94 |
| 4c | 0.60:0.40 | 94 |

The copolymers obtained above were dissolved in a mixture of 2 parts water and 1 part 25% ammonia and combined to form an 8% sizing bath with an anionic cornstarch, available commercially under the name "Amisol 05590". The solids ratio of sizing material to starch is 0.4:7.84. These baths were applied in a laboratory sizing press to an unsized 80 g paper so that the applied amount of sizing material was 0.2% of the weight of the paper. The paper was dried in the sizing press at 140°–160° C. in ca. 5 seconds. The resulting sizing values are shown in Table V:

TABLE V

| Copolymer used as sizing material | Water absorb. (DIN 53132) 60 sec. [gr/m$^2$] | Degree of sizing (DIN 53145) [sec.] | Surface strength (Dennison Test) | Remarks |
|---|---|---|---|---|
| unsized | 89 | <1 | 11 | Comparison |
| 1a | 21.1 | 958 | 18 | Comp. experiment |
| 1b | 20.5 | 1056 | 20 | |
| 1c | 18.4 | 2151 | 20 | |
| 1d | 18.4 | 2192 | 20 | |
| 1e | 18.5 | 2255 | 20 | |
| 1f | 18.9 | 1882 | 20 | |
| 1g | 19.3 | 1002 | 20 | |
| 2a | 20.1 | 980 | 20 | Comp. experiment |
| 2b | 18.9 | 2143 | 20 | |
| 2c | 18.7 | 2021 | 20 | |
| 3a | 20.9 | 970 | 19 | Comp. experiment |
| 3b | 19.0 | 1823 | 20 | |
| 3c | 18.8 | 1903 | 20 | |
| 4a | 20.7 | 905 | 19 | Comp. experiment |
| 4b | 19.2 | 1802 | 20 | |
| 4c | 19.0 | 1854 | 20 | |

What is claimed as new and sought to be protected by Letters Patent of the United States is:

1. A random solid terpolymer of maleic anhydride, dicyclopentadiene, and a vinylcyclohexene, useful as a paper size.

2. The copolymer of claim 1 wherein said vinylcyclohexene is 1-vinylcyclohexene-3.

3. The copolymer of claim 1 or claim 2 wherein the molar ratio of maleic anhydride to the diene is from 2:1 to 1:1.

4. The copolymer of claim 1 or claim 2 wherein the molar ratio of dicyclopentadiene to vinylcyclohexene is between 0.95:0.05 and 1:1.

5. The copolymer of claim 3 wherein the molar ratio of dicyclopentadiene to vinylcyclohexene is between 0.95:0.05 and 1:1.

* * * * *